(12) United States Patent
Calderon et al.

(10) Patent No.: US 7,460,545 B1
(45) Date of Patent: Dec. 2, 2008

(54) ENHANCED SDRAM BANDWIDTH USAGE AND MEMORY MANAGEMENT FOR TDM TRAFFIC

(75) Inventors: Juan-Carlos Calderon, Fremont, CA (US); Soowan Suh, San Ramon, CA (US); Jing Ling, Fremont, CA (US); Jean-Michel Caia, San Francisco, CA (US); Augusto Alcantara, Fremont, CA (US); Alejandro Lenero Beracoechea, Dublin, CA (US)

(73) Assignee: Intel Corporation, Santa Clara, CA (US)

( * ) Notice: Subject to any disclaimer, the term of this patent is extended or adjusted under 35 U.S.C. 154(b) by 729 days.

(21) Appl. No.: 10/867,199

(22) Filed: Jun. 14, 2004

(51) Int. Cl.
*H04L 12/28* (2006.01)

(52) U.S. Cl. .................... 370/395.7; 370/321; 370/347; 370/382; 370/379; 711/5

(58) Field of Classification Search ................ 370/539, 370/476, 395.7, 379, 321, 347; 711/105; 365/230.03
See application file for complete search history.

(56) References Cited

U.S. PATENT DOCUMENTS

| | | | | |
|---|---|---|---|---|
| 5,430,676 A | * | 7/1995 | Ware et al. | 365/189.02 |
| 5,511,024 A | * | 4/1996 | Ware et al. | 365/189.04 |
| 5,587,961 A | * | 12/1996 | Wright et al. | 365/233.16 |
| 5,814,456 A | * | 9/1998 | O'Rand et al. | 435/7.1 |
| 6,278,654 B1 | * | 8/2001 | Roohparvar | 365/238.5 |
| 6,587,389 B2 | * | 7/2003 | De Paor et al. | 365/222 |
| 7,042,913 B2 | * | 5/2006 | Jarabek et al. | 370/506 |
| 2003/0043851 A1 | * | 3/2003 | Wu et al. | 370/476 |
| 2003/0217223 A1 | * | 11/2003 | Nino et al. | 711/105 |
| 2003/0225987 A1 | * | 12/2003 | Roohparvar | 711/167 |
| 2004/0076044 A1 | * | 4/2004 | Nowshadi | 365/200 |
| 2005/0094669 A1 | * | 5/2005 | Bhardwaj | 370/476 |

OTHER PUBLICATIONS

Infineon Technology; HYB25D256400/800T/AT 256-MBit Double Data Rata SDRAM: 2001; pp. 1-72.*

* cited by examiner

*Primary Examiner*—Ricky Ngo
*Assistant Examiner*—Dewanda Samuel
(74) *Attorney, Agent, or Firm*—Blakely, Sokoloff, Taylor & Zafman LLP

(57) ABSTRACT

A method and apparatus for managing memory for time division multiplexed high speed data traffic is provided. The method and apparatus utilize an interleaving approach in association with multiple memory banks, such as within SDRAM, to perform highly efficient data reading and writing. The design issues a first command or access command, such as a read command or write command to one memory bank, followed by an active command to a second memory bank, enabling efficient reading and writing in a multiple data flow environment, such as a SONET/SDH virtual concatenation environment using differential delay compensation.

20 Claims, 3 Drawing Sheets

ENHANCED SDRAM BANDWIDTH USAGE AND MEMORY MANAGEMENT FOR TDM TRAFFIC

BACKGROUND OF THE INVENTION

1. Field of the Invention

The present invention relates generally to the field of high speed data transfer, and more specifically to managing virtually concatenated payloads in specific data transfer architectures, such as SONET/SDH.

2. Description of the Related Art

Data communication networks receive and transmit ever increasing amounts of data. Data is transmitted from an originator or requester through a network to a destination, such as a router, switching platform, other network, or application. Along this path may be multiple transfer points, such as hardware routers, that receive data typically in the form of packets or data frames. At each transfer point data must be routed to the next point in the network in a rapid and efficient manner.

Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). As used herein, the SONET/SDH concepts are more fully detailed in various ANSI and ITU standards, including but not limited to the discussion of concatenated payloads, ITU-T G.707 2000, T1.105-2001 (draft), and T1.105.02-1995.

The virtual concatenation standard for SONET/SDH defines a maximum differential delay compensation range of 2048 frames, where differential delay compensation is the amount of time compensation required to keep a large number of concatenated channels aligned. For 10 Gbps traffic, 2048 frames of data translate to 320 Mbytes of data. Given this relatively large size, typical SRAMs (static random access memories) cannot store this data. SDRAM, synchronous dynamic random access memory, available in large number of bytes, is the preferred choice for performing differential delay compensation on these relatively large amounts of data.

However, SDRAM has high latency for read and write accesses when accessing different rows of the same bank. As 10 Gbps reading and 10 Gbps writing bandwidths are required to support differential delay compensation for virtual concatenation in SONET/SDH, and the maximum bandwidth available, without considering latency, in 166 MHz DDR SDRAM with 64-bit bus width is only 21.248 Gbps, the required access efficiency using 166 MHz DDR SDRAM memory for 10 Gpbs traffic is very high. Many previous methods for decreasing latency are not sufficiently effective for use in very high-speed networking applications using SDRAM in virtual concatenation applications.

A design that uses high speed SDRAM, such as 166 MHz DDR SDRAM, in processing virtual concatenation payloads using differential delay compensation compliant with SONET/SDH standards and that minimizes latency in such processing may provide advantageous qualities over previously known designs, including designs compliant with the SONET/SDH architecture.

DESCRIPTION OF THE DRAWINGS

The present invention is illustrated by way of example, and not by way of limitation, in the figures of the accompanying drawings in which.

DETAILED DESCRIPTION OF THE INVENTION

The present design provides for enhanced SDRAM usage and memory management in the presence of TDM (time division multiplexed) traffic, such as virtual concatenation payload traffic, by providing minimal latency using a novel interleaving design.

SONET/SDH defines optical carrier levels and electrically equivalent synchronous transport signals (STSs) for the fiber-optic based hierarchy. In SONET, any type of service, ranging from voice to high speed data and video, can be accepted by various types of service adapters. A service adapter maps the signal into the payload envelope of the STS-1 or virtual tributary. All inputs received are eventually converted to a base format of a synchronous STS-1 signal at 51.84 Mbps or higher. Several synchronous STS-1s may then be multiplexed together in either a single or two stage process to form an electrical STS-n signal, where n is one or more.

SONET uses a basic transmission rate of STS-1, equivalent to 51.84 Mbps. Higher level signals are integer multiples of the base rate. For example, STS-3 is three times the rate of STS-1, i.e. three times 51.84 or 155.52 Mbps, while an STS-12 rate would be twelve times 51.84 or 622.08 Mbps. The SONET architecture employs frames, where the frame is generally divided into two main areas: transport overhead and the synchronous payload envelope, or SPE. The SPE comprises two components, namely STS path overhead and payload. The payload is the traffic being transported and routed over the SONET network. Once the payload is multiplexed into the SPE, the payload can be transported and switched through SONET without having the need to be examined and possibly demultiplexed at intermediate nodes.

The SONET/SDH architecture supports the concept of Virtually Concatenated Payloads. Virtual concatenation enables dividing payloads to improve partitioning of SONET/SDH bandwidth and more efficiently carry traffic. Virtual concatenation employs the base SONET/SDH payloads and groups these payloads together to create a larger, size appropriate aggregate payload based on the STS and SPE employed. Virtual concatenation thus enables variation of the payload capacity and allows payload sizes matching client service data rate. This sizing enhancement allows a larger number of channels to be mapped into the SONET/SDH signal.

Figure 1:
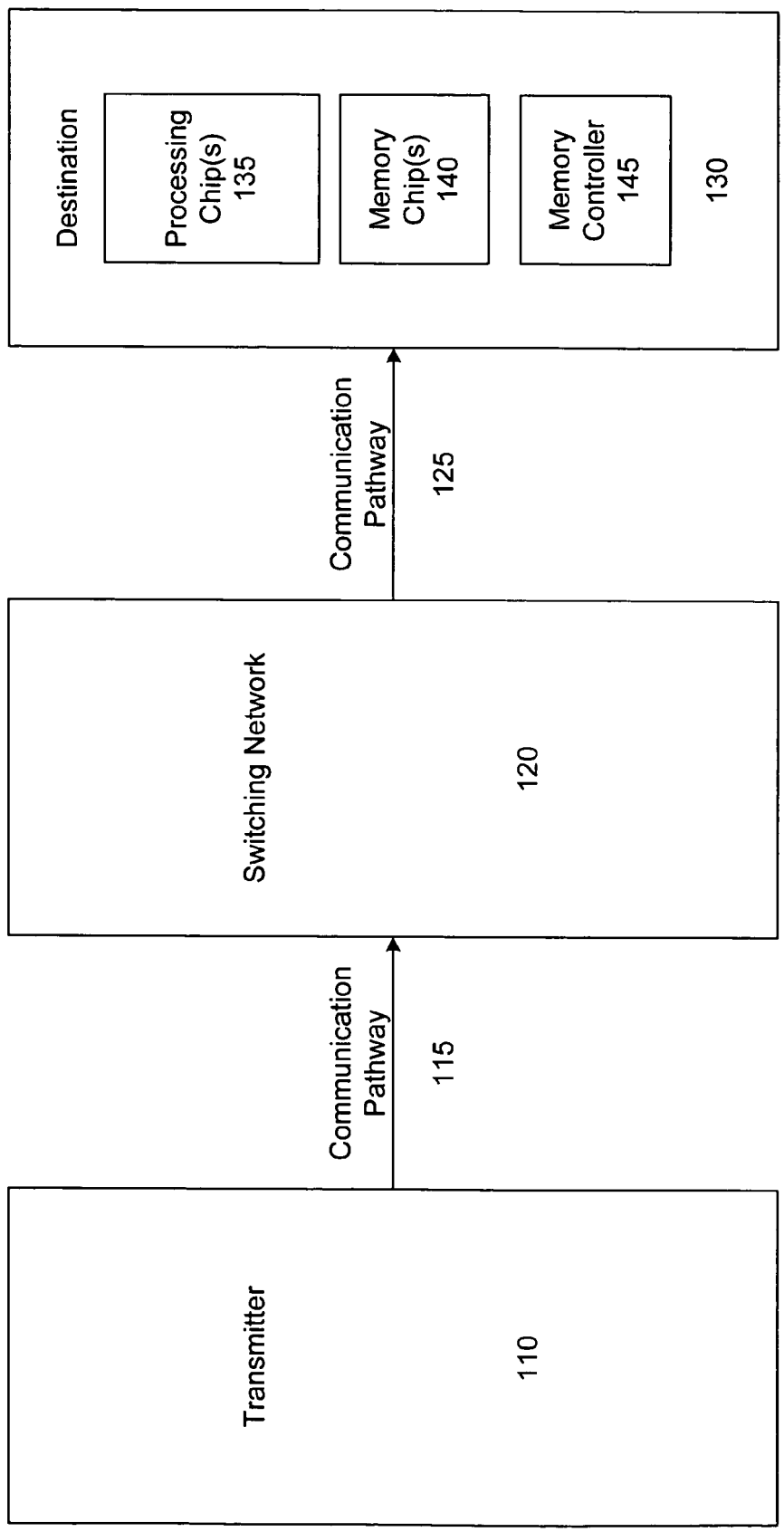
FIG. 1 is a conceptual illustration of a SONET/SDH communications switching system.

A typical SONET/SDH switching system 100 is shown in FIG. 1. In the SONET/SDH switching system 100, a transmitter 110 is connected through a communication pathway 115 to a switching network 120. Switching network 120 is connected through a communication pathway 125 to a destination 130. The transmitter 110 sends a frame as a series of payloads to the destination 130 through the switching network 120. In the switching network 120, packets typically pass through a series of hardware and/or software components, such as servers. As each payload arrives at a hardware and/or software component, the component may store the payload briefly before transmitting the payload to the next component. The packets proceed individually through the network until they arrive at the destination 130. The destination 130 may contain one or more processing chips 135 and/or one or more memory chips 140, where memory chip 140 may be SDRAM. Further, the destination may include a memory controller 145.

In virtual concatenation, each SPE within a concatenated group representing the data frame for transmission contains an identifier, called a Multi-Frame Identifier, or MFI. The MFI forms part of the SONET/SDH path overhead information in the SPE and indicates the SPE's sequence and position within the group. As may be appreciated, the ability to identify the individual payloads by the MFI provides the ability for the system to split the payloads into various sizes or configurations, as long as the MFI is provided with each payload.

Virtual concatenation does not require intermediate node support, so the source 110 and destination 130 for this network are the only specialized hardware required. The destination 130 reassembles the SPEs in the correct order to recover the data. To compensate for different arrival times of the received data, a phenomenon known as differential delay, the receiving circuits has typically contained some buffer memory so that the data can be properly realigned.

The transmission rates and capacities of virtually concatenated payloads may vary, and may include, for example, SONET/SDH designations VC-3 and VC-4, which have payload capacities of 48.960 Mbit/s and 149.760 Mbit/s, respectively. The VC-3 and VC-4 designations represent the virtual containers where, for example, VC-4 includes 9 rows of 261 columns transmitted in a 125 microsecond interval, and VC-3 is 9 rows of 85 columns transmitted in the 125 microsecond interval.

The challenge faced occurs upon reception of virtually concatenated payloads. Such payloads are typically received and stored in storage buffers and reassembled either by separate processors or by a single processor that must await receipt of all virtually concatenated payloads. Due to the differential delay, data or payloads in the same group may arrive at the destination 130 at different times. The system can be slow to act on the payloads received.

As noted above, SRAM is insufficient for processing virtually concatenated payloads compliant with all SONET/SDH specifications, particularly the differential delay compensation requirement. Relatively large amounts of data may be processed using differential delay compensation, and SDRAM is preferred over SRAM to store the data in this application.

This invention describes a memory access algorithm that suitable for use in connection with SDRAM where the access latency time is relatively high compared with the time used to transfer, i.e. read and write, data. The present design is directed to a memory controller that uses bank interleaving techniques, where most SDRAM devices support such techniques. The present design organizes different accesses to the memory such that multiple data flows passing through the memory are interleaved by storing them in different memory banks.

The SONET/SDH traffic in a virtual concatenation payload environment provides for an acceptable interleaving structure. In a 10 Gbps (or OC-192) SONET data flow, 192 STS-1 time slots can be separated into 192 independent data flows of equal data rate. As each SDRAM chip normally has four banks, the present design uses an interleaving pattern of four data flows, each data flow including 48 STS-1 time slots.

The present design is applicable to any divisible data flow, or any TDM traffic made up of separate or separable traffic flows.

Figure 2:
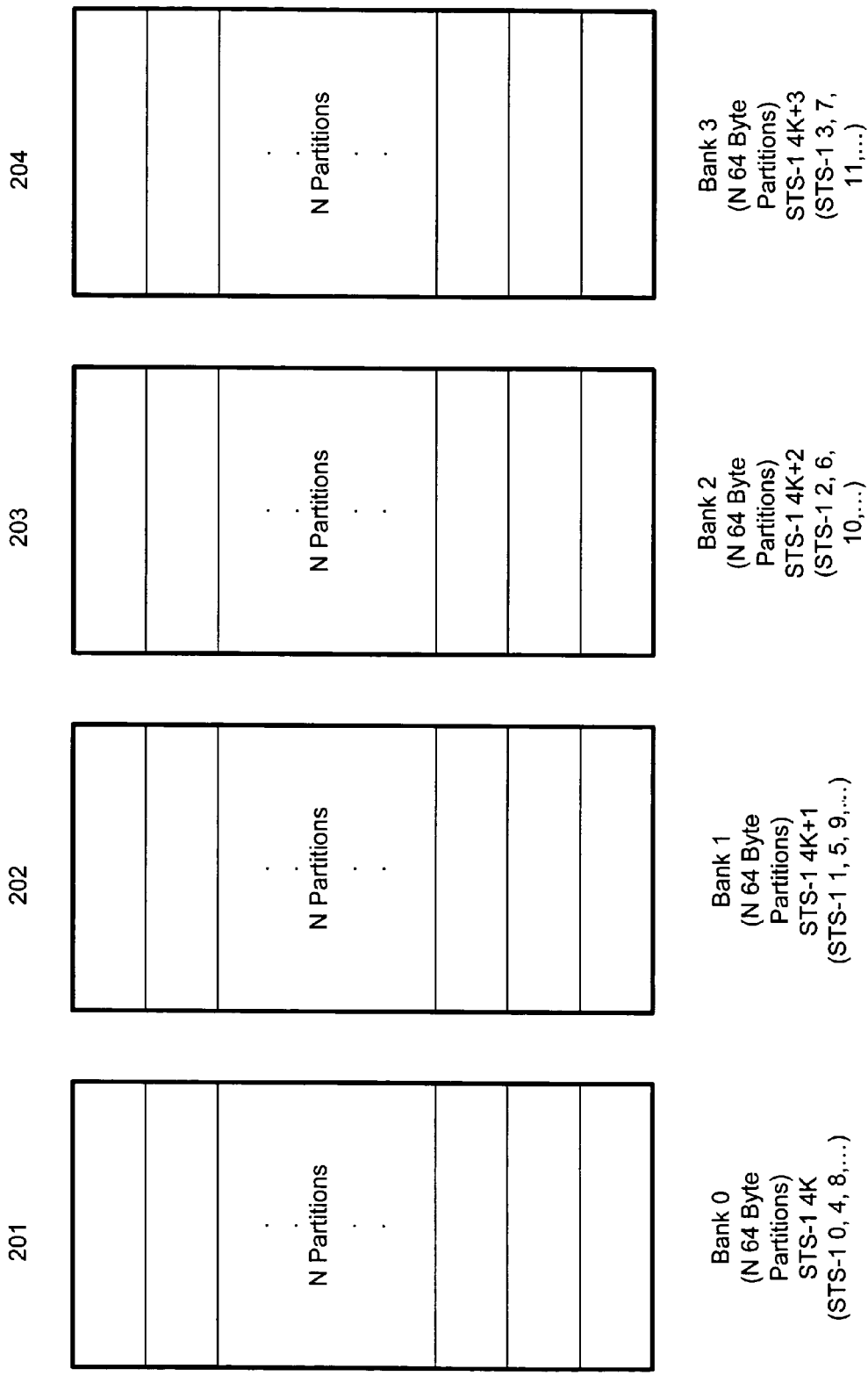
FIG. 2 is a drawing of a division of memory, such as DDR DSDRAM, into multiple memory banks.

FIG. 2 shows the organization of the differential delay compensation buffer memory in an SDRAM. The SDRAM is divided into four banks, 201, 202, 203, and 204, and each bank stores data from 48 STS-1 time slots. Memory controller read and write access to each of these four banks is independent of access to the other banks. Also, the SDRAM is divided into 64-byte partitions and a partition is accessed (read or written) continuously as a burst, meaning data is all read or written to the partition at one time.

From FIG. 2, all 64 bytes in each partition are payload data from an STS-1 slot, including stuff bytes (non information bits) if stuff bits have been inserted. For a 10 Gbps OC-192 data flow, the minimum required bandwidth for both read and write accessing, considering only payload rate, is 9.953×2×87/90=19.243 Gbps. Required bandwidth may be higher if stuff bytes are added to the data stream. If the system uses a 166/333 DDR SDRAM, the maximum attainable bandwidth using a 64-bit interface is 333×64=21.312 Gbps, providing bandwidth usage in excess of 90%.

The system initializes the SDRAM and, once initialized, operates according to the following procedure to read and write data. The memory controller issues an ACTIVE command to "open" a row from a bank (to be read or written). This ACTIVE command establishes both the bank to be opened and the appropriate row number for that bank. Once a row is "open", the memory controller can issue a READ or WRITE command after the time tRCD, where tRCD is 18 nanoseconds, or 3 clock cycles using DDR333. In this timing scheme, a clock cycle refers to one clock period at 166 MHz for DDR333. Once the memory controller issues a READ command, data becomes available after a CAS latency (Column Access Strobe latency, or CL) of 2.5 clock cycles in DDR333. The memory controller can then issue another ACTIVE command to a different row in the same bank only after the previous active row has been "closed," or precharged. The time from issue of the READ command by the memory controller to the start time of the auto-precharge procedure is equal to either the data burst length divided by two clock cycles or data burst length divided by four clock cycles, with data burst length equal to eight clock cycles. The time from start of precharge until the row is "closed," or the controller issues the next ACTIVE command, is three clock cycles. Without interleaved access to different banks, the time required to read an eight word data burst from one ACTIVE to the next ACTIVE command for a different row in the same bank is equal to 3 (tRCD time) plus 4 (READ to auto-precharge) plus 3 (precharge until row closed) or 10 clock cycles at 166 MHz. In this scenario, the achieved bandwidth is 8 bytes×64 bits/(10 clock cycles×6.024 ns), equal to 8.5 Gbps or 40 percent of the total bandwidth, typically an unacceptable value.

The present design ensures that the memory controller issues a series of consecutive reads, each read issued to a different bank. Issuing multiple reads to different banks provides enough time between ACTIVE commands issued to the same bank when a four bank interleaving scheme is employed. In this way, the memory controller can read a row in one bank and activate a row in a different bank before closing the row currently being read.

Figure 3:
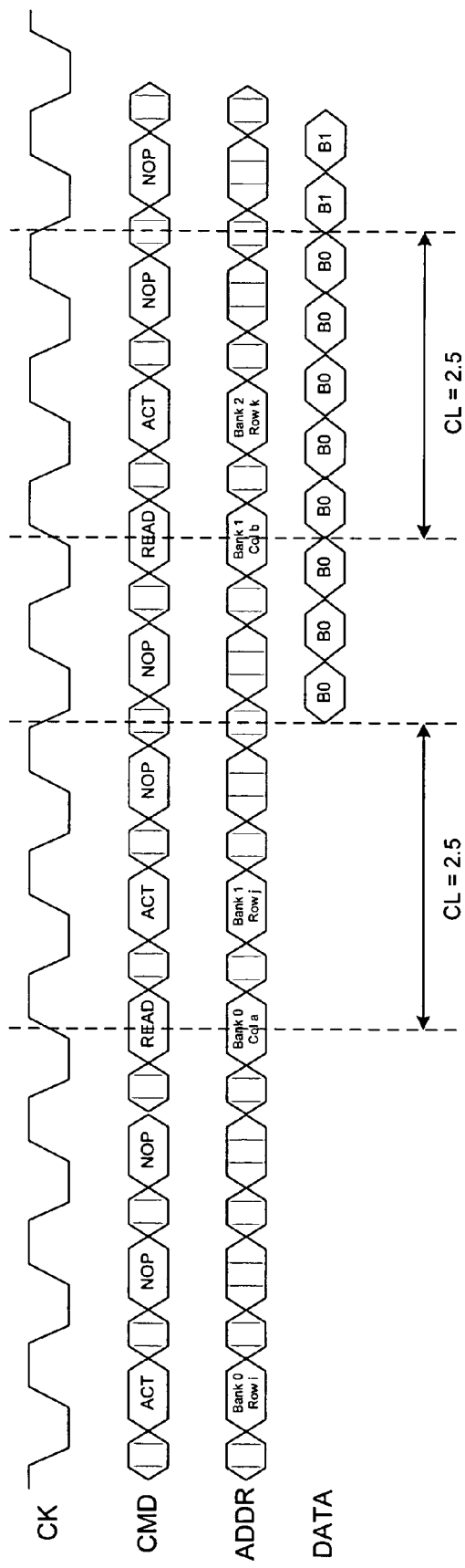
FIG. 3 is a timing diagram showing operation of the clock, commands, addresses, and data, as well as CAS latency.

The timing sequence for the read function is illustrated in FIG. 3. From FIG. 3, clock signal CK shows the various clock cycles employed. The command issued from the memory controller is an ACT, or ACTIVE, command, followed by two no operation commands, followed by a READ command.

Subsequent to the READ command, within the same clock cycle, the memory controller issues another ACTIVE command on a different row, and the sequence repeats itself. As shown, the address for the first ACTIVE command shown is for Bank 0, Row i. The subsequent READ command is for Bank 0, Column a, and the next ACTIVE for Bank 1, row j, and so forth. The CAS latency of 2.5 clock cycles is illustrated to show the delay between issuance of the READ command and the time when data is available, as shown in the Data line of FIG. 3. As shown in this drawing, the memory controller can read a row in one bank, such as Bank 0, and activate a row in a different bank, such as Bank 1 before closing the Bank 0 row being read.

Excluding the initial setup time for the first read, output data in this arrangement is continuous and efficiency approaches or is equal to 100 percent. This high level of efficiency may be realized by interleaving the 192 data flows into four different banks, using a burst size of 8 words. Similarly, continuous write operation can be achieved using four bank interleaving. These values are not intended to be limiting, but instead are an example of the type of timing and interleaving that can be used and are presented for illustrating the concepts of the design presented herein. Besides the values disclosed above, other values may be used to result in 100 percent or at least near 100 percent access efficiency if an appropriate combination of sizes and timings is employed.

The actual attainable efficiency may not be 100 percent, since some penalty must be paid when switching from read to write and from write to read. Also, some time is necessary to refresh the SDRAM. Also, when issuing both read bursts and write bursts, a WRITE command can be issued only after all output data (from READ command) is ready. Other losses may be incurred, decreasing overall reading and writing efficiency from 100 percent. To increase the usable bandwidth, the switching rate from read to write or vice versa may be reduced. As 192 independent data flows may be present at any one time in, for example, virtual concatenation data processing compliant with SONET/SDH, increasing the number of read (and write) bursts can be readily implemented in the memory controller. For example, 16 read bursts (8 words per burst) may be alternated with 16 write bursts, and so on. To simplify the implementation, a refresh command is issued every 9 read/write sequences (a read/write sequence includes 16 read bursts and 16 write bursts). The overhead for each refresh is 10 clock cycles. The final result for achievable bandwidth is as follows: time for each read/write sequence is (16×4×2)+1.5+3.5 or 133 clock cycles. Time for each refresh period is 133×9+10 or 1207 clock cycles. The time used for data access during each refresh period is 16×4×2×9 or 1152 clock cycles. Overall usable bandwidth in this example is 1152 divided by 1207, or over 95 percent.

Again, these values are an example and are not meant to be limiting. As long as the dataflow includes multiple independent TDM flows having equal bandwidth, the present design may be used to enable the SDRAM to meet the high bandwidth usage requirement. The present design is also applicable to independent flows where bandwidth of one flow is a multiple of at least one other flow. The higher bandwidth flow or flows can be de-interleaved into multiple flows (per byte, per word or per burst) to make all flows exhibit the same bandwidth. Alternately, the lower bandwidth flow can be padded with idle cycles to achieve the same bandwidth. A combination of de-interleaving and padding can be used to support multiple configurations of independent flows.

It will be appreciated to those of skill in the art that the present design may be applied to other systems that perform data processing, and is not restricted to the communications structures and processes described herein. Further, while specific hardware elements and related structures have been discussed herein, it is to be understood that more or less of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A method for enabling interleaved accessing of time division multiplexed dataflows in a synchronous dynamic random access memory (SDRAM), comprising:
    receiving a data flow having virtually concatenated payloads;
    dividing the received data into a first subflow and a second subflow;
    establishing a plurality of memory banks in the SDRAM;
    issuing an active command for a row of data within a first memory bank;
    issuing a sequence of consecutive write commands on said first memory bank using data from the first subflow, said first command comprising one from a group comprising a read command and a write command;
    issuing a subsequent active command for a row of data within a second memory bank using data from the second subflow;
    issuing a sequence of consecutive write commands on said second memory bank using data from the second subflow;
    issuing a refresh command for each row of the memory banks to prevent data within each row is from being lost; and
    reading data within the first and second memory banks after issuing the subsequent active command.

2. The method of claim 1, further comprising issuing a second command on said second memory bank after operating on data within the first memory bank.

3. The method of claim 2, further comprising repeatedly interleaving issuing active commands to a plurality of banks, wherein read commands are issued for a first bank and write commands are issued for a second bank.

4. The method of claim 1, wherein issuing the first command comprises issuing a read command, and operating on data within the first memory bank comprises reading data within the first data bank.

5. The method of claim 1, wherein issuing the first command comprises issuing a write command, and operating on data within the first memory bank comprises writing data within the first data bank.

6. The method of claim 1, wherein said time division multiplexed dataflows comprise dataflows having different bandwidths.

7. The method of claim 1, further comprising issuing no operation commands between said active command and said first command.

8. A system for performing interleaved access of time division multiplexed dataflows by a synchronous dynamic random access memory (SDRAM), comprising:
    a plurality of memory banks within the SDRAM; and
    a memory controller operable to:
        receive a data flow having virtually concatenated payloads;
        divide the received data into a first subflow and a second subflow;
        issue an active command for a row of data within a first memory bank;

issue a sequence of consecutive write commands on said first memory bank using data from the first subflow, said first command comprising one from a group comprising a read command and a write command;

issue a subsequent active command for a row of data within a second memory bank;

issue a sequence of consecutive write commands on said second memory bank using data from the second subflow;

reading data within the first and second memory banks after issuing the subsequent active command; and issue a refresh command for each row of the memory banks to prevent data within each row is from being lost.

9. The system of claim 8, wherein said memory controller further issues a second command on said second memory bank after operating on data within the first memory bank.

10. The system of claim 9, wherein the memory controller operates to repeatedly interleave issuing active commands to one bank, issuing subsequent access commands for the one bank, and operating on data within the one bank with identical operations for another bank.

11. The system of claim 8, wherein the memory controller issuing the first command comprises issuing a read command, and operating on data within the first memory bank comprises reading data within the first data bank.

12. The system of claim 8, wherein the memory controller issuing the first command comprises issuing a write command, and operating on data within the first memory bank comprises writing data within the first data bank.

13. The system of claim 8, wherein the time division multiplexed dataflows comprise dataflows having different bandwidths.

14. The system of claim 8, wherein the memory controller further operates to issue no operation commands between said active command and said first command.

15. A method for enabling interleaved reading and writing of time division multiplexed dataflows in a plurality of memory banks, comprising:

receiving a data flow;

dividing the received data into a first subflow and a second subflow;

issuing an active command for a row of data within a first memory bank;

issuing a sequence of consecutive write commands on said first memory bank using data from the first subflow;

issuing a subsequent active command for a row of data within a second memory bank using data from the second subflow;

issuing a sequence of consecutive write commands on said second memory bank using data from the second subflow;

issuing a refresh command for each row of the memory banks to prevent data within each row is from being lost, wherein the refresh command is issued every nine read/write sequences, wherein a read/write sequence includes 16 read bursts and 16 write bursts; and reading data within the first and second memory banks after issuing the subsequent active command.

16. The method of claim 15, wherein a useable bandwidth of the memory banks is about 90 percent or greater.

17. The method of claim 16, wherein the useable bandwidth is determined using the number of clock cycles required for an active command for a row, a tRCD (time RAS-to-CAS), CAS latency, and for row refresh.

18. The method of claim 15, wherein a useable bandwidth of the memory banks is about 95 percent or greater.

19. The method of claim 18, further comprising repeatedly interleaving issuing active commands to a plurality of banks, wherein read commands are issued for a first bank and write commands are issued for a second bank.

20. The method of claim 15, wherein operating on time division multiplexed dataflows comprises receiving dataflows having different bandwidths.

* * * * *